Aug. 25, 1942.  C. C. ALVORD  2,294,153

GRINDING WHEEL-SPEED CONTROL

Filed Oct. 23, 1941  2 Sheets-Sheet 1

Inventor
CHARLES C. ALVORD
By Harold W. Eaton Attorney

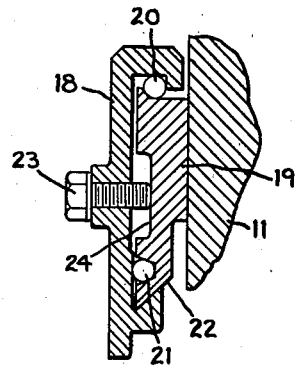
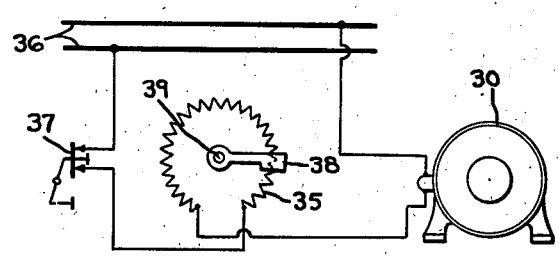
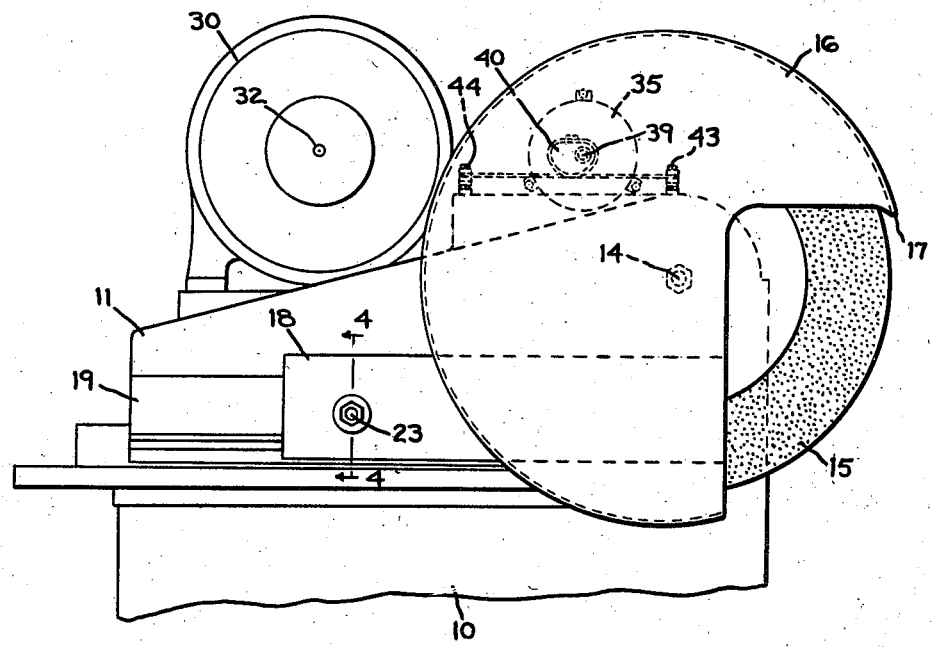

Patented Aug. 25, 1942

2,294,153

UNITED STATES PATENT OFFICE 2,294,153

GRINDING WHEEL SPEED CONTROL

Charles C. Alvord, Worcester, Mass., assignor to Norton Company, Worcester, Mass., a corporation of Massachusetts Application October 23, 1941, Serial No. 416,158

6 Claims. (Cl. 51—166)

The invention relates to grinding machines, and more particularly to a speed regulating device for maintaining a substantially constant peripheral speed for the grinding wheel.

One object of the invention is to provide a simple and thoroughly practical grinding machine having a grinding wheel speed regulating mechanism whereby a substantially constant peripheral speed of the wheel may be maintained as it wears away. Another object of the invention is to provide a motor driven mechanism for driving a grinding wheel at a substantially constant peripheral speed. A further object of the invention is to provide a grinding wheel speed regulating mechanism whereby a variable speed motor driven mechanism is automatically adjusted in timed relation with adjustment of the grinding wheel guard whereby a constant peripheral speed may be maintained as the wheel decreases in size due to wheel wear. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of the invention:

Fig. 3 is a fragmentary left-hand elevation of the grinding wheel slide unit;

Fig. 4 is a fragmentary cross-sectional view, taken approximately on the line 4—4 of Fig. 3, through the slide which supports the grinding wheel guard; and Fig. 5 is an electric wiring diagram of the wheel driving mechanism.

Figure 1:
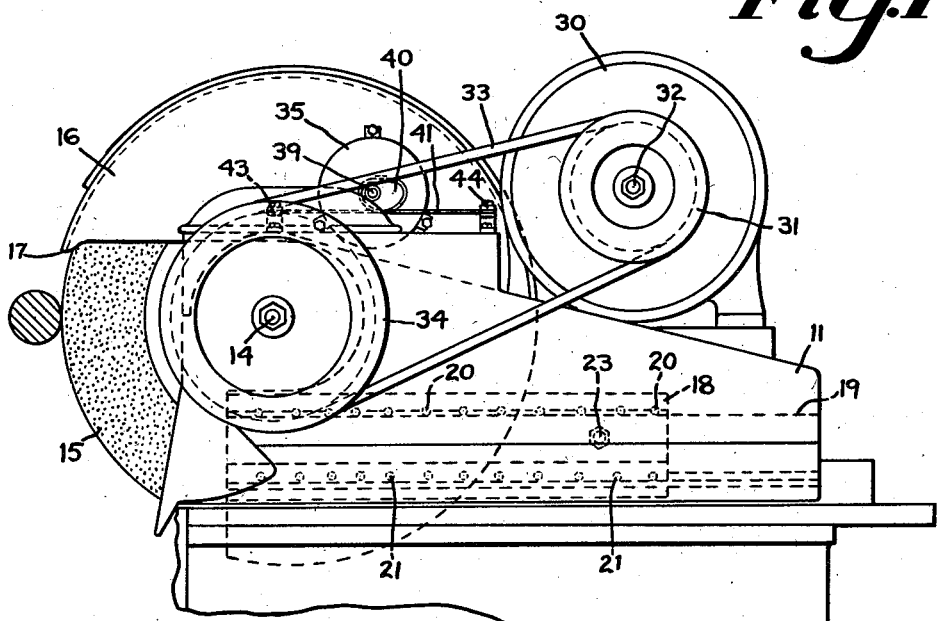
Fig. 1 is an end elevation of a portion of a cylindrical grinding machine embodying this invention.

A grinding machine has been illustrated in the drawings comprising a base 10 which supports a transversely movable grinding wheel slide 11 on a V-way 12 and a flat way 13 formed on the upper surface of the base 10. The wheel slide 11 serves as a rotatable support for a grinding wheel spindle 14 which is journalled in bearings (not shown) carried by the wheel slide 11. A grinding wheel 15 is mounted on one end of the wheel spindle 14. The grinding wheel 15 is enclosed by a wheel guard 16 which is adjustably supported on the wheel slide 11 and serves as a safety medium in case of grinding wheel breakage. Only the front portion of the wheel guard adjacent to the work piece is open.

Figure 2:
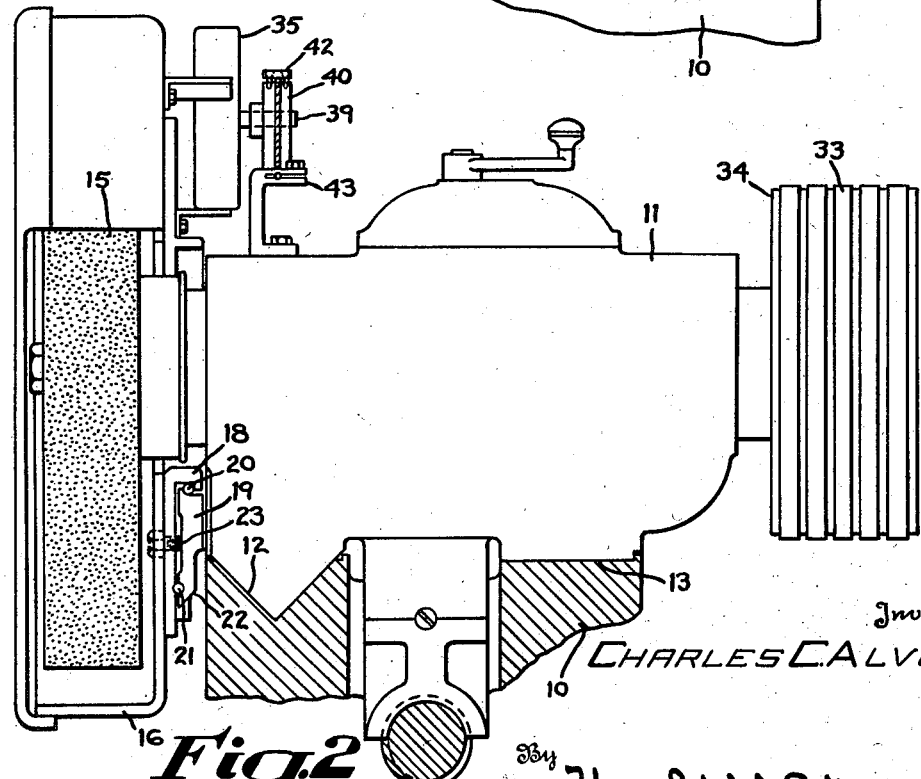
Fig. 2 is a fragmentary front elevation, on an enlarged scale, of the grinding wheel slide unit shown in Fig. 1.

The wheel guard 16 is arranged so that it may be adjusted transversely relative to the wheel slide 11 so as to maintain the front open edge or lip 17 of the guard 16 in close proximity to the periphery of the grinding wheel 15. A slide member 18 is formed integral with or fixedly mounted to the guard 16. A slide member 19 is fixedly mounted on the right-hand side face of the wheel slide 11 (Fig. 2). Antifriction slideways are provided comprising a pair of spaced rows of balls 20 and 21 which are interposed between the slide members 18 and 19. The lower portion of the slide member 18 is provided with a slide surface mating with a correspondingly shaped angular slide surface 22 formed on the slide member 19 (Fig. 2). It will be readily apparent from the foregoing disclosure that the slide 16 may be readily and easily adjusted transversely relative to the wheel slide 11 on the slideways above described to maintain the wheel guard lip 17 in the desired relationship with the periphery of the grinding wheel 15 as it wears away. A clamping screw 23 is screw threaded through a portion of the slide member 18 and is arranged to engage a surface 24 on the slide member 19 to facilitate locking the slide 18 and the wheel guard 16 in the desired adjusted position.

The wheel spindle 14 and the grinding wheel 15 are preferably electrically driven by means of a variable speed electric motor 30 which is mounted on the upper portion of the wheel slide 11. A multi-V-groove pulley 31 is mounted on the end of a motor shaft 32. The pulley 31 is connected by multiple V-belts 33 with a multi-V-groove pulley 34 which is mounted on the end of the wheel spindle 14.

A rheostat 35 is provided for adjusting the speed of the motor 30. As illustrated in the wiring diagram (Fig. 5), power is supplied from a suitable source, such as indicated by the power lines 36. A push button switch 37 is provided for opening and closing the circuit to stop and start the motor 30 and thereby to control the stopping and starting of the rotation of the grinding wheel 15 as desired. By adjusting a rheostat control arm 38, the speed of the motor 30 may be varied. The control arm 38 illustrated diagrammatically in Fig. 5 is mounted on a rheostat shaft 39.

In order to attain one object of the invention, a suitable control mechanism is provided whereby the peripheral speed of the grinding wheel 15 may be maintained at a substantially constant rate as the grinding wheel 15 wears away during grinding. In the preferred form, the rheostat 35 is mounted on the wheel guard 16 and is arranged so that when the wheel guard 16 is adjusted transversely to maintain the lip 17 in close proximity to the operative face of the grinding wheel, the speed of the driving motor 30 will be automatically adjusted successively to increase the peripheral speed of the wheel as it is reduced in size.

A cam shaped member 40 is mounted on the outer end of the rheostat control shaft 39. A flexible cable 41 such as, for example, an aircraft control cable, wraps around the periphery of the cam 40 and is clamped in position thereon at one point by means of a clamping block 42 (Fig. 2). The opposite ends of the cable 41 are fastened to brackets 43 and 44 (Fig. 1) which are fixedly mounted on the upper surface of the wheel slide 11. The cam-shaped member 40 is designed and shaped so that a desired and predetermined rotary or angular adjustment will be imparted to the rheostat 35 which is not directly proportional to the linear adjustment of the wheel guard 16 to maintain a substantially peripheral speed of the grinding wheel 15 as it wears away during grinding.

It will be readily apparent from the foregoing disclosure that when the wheel guard 16 is adjusted transversely, the rheostat 35 being fixedly mounted thereon moves transversely. The cable 41, the opposite ends of which are fixed relative to the wheel slide 11, will then produce a rotary motion to the cam 40 which in turn will impart a rotary adjustment to the armature control arm 38 (Fig. 5) automatically to advance or increase the speed of the motor 30 as the wheel guard 16 is adjusted transversely to compensate for wheel wear. Similarly, if the wheel guard is moved in the opposite direction such as, for example, when it is desired to replace a worn-out wheel with a new wheel, the rheostat control cam 40 and control arm 38 will be rotated in the opposite direction to decrease the speed of the motor for the new larger diameter wheel.

The operation of this improved grinding wheel speed control mechanism will be readily apparent from the foregoing disclosure. The flexible cable 41 is maintained in a taut condition by the clamping members 43 and 44. After a grinding wheel 15 has been mounted in operative position within the wheel guard 16, the wheel guard 16 may be adjusted transversely by loosening the clamping screw 23 and manually adjusting the position of the guard 16 so that the lip 17 is in close proximity to the operative peripheral surface of the grinding wheel. As the wheel guard 16 is adjusted transversely, a rotary motion is imparted through the cable 41 and cam 40 to turn the rheostat control arm 38 so as to decrease the speed of the driving motor 30 to maintain a substantially constant peripheral speed of the grinding wheel as it wears away.

It will thus be seen that there has been provided by this invention apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. In a grinding machine having a transversely movable wheel slide, a rotatable grinding wheel thereon, a wheel guard surrounding said grinding wheel, manually operable means to adjust said wheel guard transversely relative to said grinding wheel, a variable speed electric motor to rotate said wheel, and a speed control mechanism therefor including a rheostat supported on said wheel guard, a rotatable control shaft for said rheostat, a cam shaped member on said shaft to actuate said rheostat, and operative connections between said cam and wheel slide whereby said rheostat is automatically adjusted by transverse adjustment of the wheel guard so as to maintain a substantially constant peripheral speed of the grinding wheel as it wears away.

2. In a grinding machine having a transversely movable wheel slide, a rotatable grinding wheel thereon, a wheel guard surrounding said grinding wheel, manually operable means to adjust said wheel guard transversely relative to said grinding wheel, a variable speed electric motor to rotate said wheel, and a speed control mechanism therefor including a rheostat, a rotatable control shaft for said rheostat, a cam-shaped member on said shaft to actuate said rheostat, and a flexible tape surrounding said cam, said rheostat and said tape being connected with the wheel guard and wheel slide respectively whereby said rheostat is automatically adjusted by transverse adjustment of the wheel guard, said cam-shaped member being so shaped as to maintain a substantially constant peripheral speed of the grinding wheel as it wears away.

3. In a grinding machine having a transversely movable wheel slide, a rotatable grinding wheel thereon, a wheel guard surrounding said grinding wheel, a transverse slide interposed between said wheel guard and wheel slide whereby the guard may be adjusted transversely as the grinding wheel wears away, a variable speed electric motor on said slide to rotate said grinding wheel, and a speed control mechanism therefor including a rheostat supported on said wheel guard, a rotatable control shaft for said rheostat, a cam on said shaft to actuate said rheostat, and operative connections including a flexible tape which surrounds said cam and has its opposite ends fixed to said wheel slide whereby said rheostat is automatically adjusted by transverse adjustment of the wheel guard to maintain a substantially constant peripheral speed of the grinding wheel as it wears away.

4. In a grinding machine having a transversely movable wheel slide, a rotatable grinding wheel thereon, a member movable toward or from the peripheral surface of said wheel, a variable speed electric motor to rotate said wheel, a speed control mechanism therefor including a rheostat, a rotatable control shaft for said rheostat and operative connections including a rotatable cam on said shaft between said member and rheostat whereby movement of said member actuates said rheostat, said cam being so shaped and arranged that the angular adjustment of said rheostat is not directly proportional to the linear adjustment of the wheel guard so as to maintain a substantially constant peripheral speed of the grinding wheel as it wears away.

5. In a grinding machine having a transversely movable wheel slide, a rotatable grinding wheel thereon, a wheel guard surrounding said grinding wheel, a transverse slide interposed between said wheel guard and wheel slide to facilitate a transverse adjustment of the wheel guard as the grinding wheel wears away, a variable speed electric motor to rotate said grinding wheel, and a speed control mechanism therefor including a rheostat and a flexible tape to actuate the same one of which is supported on the wheel guard and the other on the wheel slide whereby said rheostat is automatically adjusted by transverse adjustment of the wheel guard to maintain a substantially constant peripheral speed of the grinding wheel as it wears away.

6. In a grinding machine having a transversely movable wheel slide, a rotatable grinding wheel thereon, a wheel guard surrounding said grinding wheel, a transverse slide interposed between said wheel guard and wheel slide to facilitate a transverse adjustment of the wheel guard as the grinding wheel wears away, a variable speed electric motor on said slide to rotate said grinding wheel, and a speed control mechanism therefor including a rheostat supported on said wheel guard, a cam to actuate said rheostat, and a flexible tape which surrounds said cam and has its opposite ends fixed to the wheel guard whereby said rheostat is automatically adjusted by transverse adjustment of the wheel guard to maintain a substantially constant peripheral speed of the grinding wheel as it wears away.

CHARLES C. ALVORD.